United States Patent
Kong et al.

(10) Patent No.: US 10,053,060 B2
(45) Date of Patent: Aug. 21, 2018

(54) WASHER NOZZLE FOR VEHICLE

(71) Applicants: Hyundai Motor Company, Seoul (KR); Kia Motors Corporation, Seoul (KR); NIFCO KOREA Inc., Asan, Chungcheongnam-Do (KR)

(72) Inventors: Nak Kyoung Kong, Gyeonggi-do (KR); Ki Hong Lee, Seoul (KR); Jong Min Park, Seoul (KR); Keon Soo Jin, Ulsan (KR); Joon Ho Sung, Gyeongsangnam-do (KR)

(73) Assignees: Hyundai Motor Company, Seoul (KR); Kia Motors Corporation, Seoul (KR); NIFCO KOREA Inc., Asan, Chungcheongnam-Do (KR)

( * ) Notice: Subject to any disclaimer, the term of this patent is extended or adjusted under 35 U.S.C. 154(b) by 0 days.

(21) Appl. No.: 15/225,209

(22) Filed: Aug. 1, 2016

(65) Prior Publication Data

US 2017/0120875 A1 May 4, 2017

(30) Foreign Application Priority Data

Nov. 2, 2015 (KR) .................. 10-2015-0153456

(51) Int. Cl.
*B60S 1/48* (2006.01)
*B05B 1/24* (2006.01)
*B60S 1/52* (2006.01)

(52) U.S. Cl.
CPC ............... *B60S 1/487* (2013.01); *B05B 1/24* (2013.01); *B60S 1/52* (2013.01)

(58) Field of Classification Search
CPC .... B60S 1/487; B60S 1/52; B60S 1/46; B60S 1/48; B60S 1/488; B60S 1/603;
(Continued)

(56) References Cited

U.S. PATENT DOCUMENTS 4,088,269 A * 5/1978 Schlick ............... B05B 1/24
137/341
5,957,385 A * 9/1999 Suhring ............... B05B 1/08
239/130

(Continued)

FOREIGN PATENT DOCUMENTS

CN 2013-21019 Y 10/2009
JP 2008-155662 A 7/2008
(Continued)

*Primary Examiner* — Steven J Ganey
*Assistant Examiner* — Juan C Barrera
(74) *Attorney, Agent, or Firm* — Mintz Levin Cohn Ferris Glovsky and Popeo, P.C.; Peter F. Corless (57) ABSTRACT

A washer nozzle for a vehicle is provided. The washer nozzle includes a multi-step locking portion having a plurality of projections formed on the top of the housing and a fixing groove where a lower interior-side end of a mounting aperture formed at a vehicle body is inserted is formed on the bottom of the housing. The washer nozzle is inserted in the mounting aperture and the washer nozzle is configured to rotate to adjust an angle about the fixing groove in which the lower interior-side end of the mounting aperture is inserted. Further, one selected projection of the multi-step locking portion is configured to be locked to a portion of the vehicle body to maintain the adjusted angle of the washer nozzle.

11 Claims, 7 Drawing Sheets

(58) Field of Classification Search
CPC .. B05B 1/24; B05B 15/62; B05B 1/10; B05B 9/002; B05C 5/001; Y10T 137/6606
USPC .......... 239/284.1, 284.2, 133, 134, 130, 135
See application file for complete search history.

(56) References Cited

U.S. PATENT DOCUMENTS

| | | | |
|---|---|---|---|
| 6,247,652 B1 * | 6/2001 | Stange ...................... | B60S 1/52 239/284.1 |
| 6,501,907 B1 * | 12/2002 | Rehs ......................... | B60S 1/52 239/133 |
| 2005/0028849 A1 * | 2/2005 | Fukushima ............... | B05B 1/08 134/198 |
| 2008/0169358 A1 * | 7/2008 | Hofmann ................ | B60S 1/603 239/284.2 |
| 2009/0032616 A1 * | 2/2009 | Semmelroth ............. | B60S 1/52 239/284.1 |
| 2014/0042243 A1 * | 2/2014 | Kim ......................... | B60S 1/52 239/130 |
| 2014/0374505 A1 * | 12/2014 | Munk ....................... | B60S 1/52 239/133 |

FOREIGN PATENT DOCUMENTS

| | | |
|---|---|---|
| KR | 20-1999-0030396 U | 7/1999 |
| KR | 10-2008-0112812 A | 12/2008 |
| KR | 10-2009-0047963 | 7/2009 |
| KR | 10-0906639 B1 | 7/2009 |
| KR | 10-1482950 B1 | 1/2015 |

* cited by examiner

RELATED ART

WASHER NOZZLE FOR VEHICLE

CROSS-REFERENCE TO RELATED APPLICATION

This application claims under 35 U.S.C. § 119(a) the benefit of priority to Korean Patent Application No. 10-2015-0153456 filed on Nov. 2, 2015, the entire contents of which are incorporated herein by reference.

BACKGROUND (a) Technical Field

The present disclosure relates to a washer nozzle for a vehicle and, more particularly, to a non-exposing type washer nozzle that adjusts an angle to change a spraying direction and a target position of washer fluid by being disposed on a hood interior panel and that heats the sprayed washer fluid.

(b) Background Art

Generally, a windshield is mounted on the front of the interior of vehicles to block wind or secure the front view while the vehicles travel. Typically, since the surface of the windshield is stained or marked with foreign substances such as dust to safely operate the vehicle by securing a sufficient front view the foreign substances such as dust on the glass must be removed. Vehicles are equipped with windshield wipers and a washer fluid system for spraying washer fluid to remove foreign substances on the windshield. Accordingly, when a driver operates a switch proximate to the driver's seat to ensure a sufficient front view through the windshield, a washer pump operates to spray the washer fluid contained in a washer fluid reservoir on to the windshield through washer nozzles. Foreign substances on the windshield that obstruct the driver's view are removed by the sprayed washer fluid and wipers, so the driver can safely operate the vehicle with the front view ensured.

Generally, washer nozzles suitable for vehicles are required to be able to spray a small amount of washer fluid in a short duration of time to wash a windshield. Recently, a spray type washer nozzle has been developed to increase the washing area. A non-exposing type and spray type washer nozzle, in which a washer nozzle is fitted within an aperture in a hood interior panel has been developed. For example, the non-exposing type is fixed to a hood interior panel and is configured to spray washer fluid to a windshield from beneath the hood of the vehicle. This type of washer nozzle is disposed in a hood interior panel, which does not protrude onto the exterior of a vehicle, so the washer nozzle itself is a non-exposing type and the external appearance of a vehicle is not altered.

The non-exposing type washer nozzle of the related art is fixed within an aperture disposed in a hood interior panel by tension of a locking step formed on a housing. In other words, the angle of the washer nozzle and the spraying direction of washer fluid are fixed. For example, the washer nozzle is inserted into a aperture in a hood interior panel and then a locking step at the upper portion of the nozzle and the lower portion of the nozzle are coupled to the upper and lower portions of the aperture and there is no structure to adjust the nozzle angle. Accordingly, the spraying direction of washer fluid is fixed and it is impossible to adjust the washer fluid to a desired target point. Further, washer nozzles of the related art do not have a heating unit capable of heating washer fluid, and thus washer fluid at low temperature cannot reach a desired target point in a low-temperature area or in winter, for example, washer fluid is sprayed under a desired position.

The above information disclosed in this section is merely for enhancement of understanding of the background of the invention and therefore it may contain information that does not form the prior art that is already known in this country to a person of ordinary skill in the art.

SUMMARY

The present invention provides a non-exposing type washer nozzle that may adjust an angle to change a spraying direction and a target position of washer fluid by being disposed on a hood interior panel and may heat sprayed washer fluid.

Accordingly, in one aspect, the present invention provides a washer nozzle for a vehicle that may include a housing, a washer hose connector disposed on the housing, and a nozzle portion disposed on the housing configured to spray washer fluid forward. A multi-step locking portion having a plurality of projections may be formed on the top of the housing. A fixing groove where a lower interior end of a mounting aperture formed at a vehicle body is inserted may be formed on the bottom of the housing. The washer nozzle may be inserted into the mounting aperture. and may be configured to rotate about an angle (e.g., be turned up and down) of the fixing groove in which the lower interior end of the mounting aperture is inserted. Further, one selected projection of the multi-step locking portion may be configured to be locked to a portion of the vehicle body to maintain the adjusted angle of the washer nozzle.

The multi-step locking portion may have a shape that protrudes upward on the housing and elongated in the front-rear direction of the washer nozzle and may be configured to be elastically transformed vertically with respect to a joint with the housing. The projections may be formed at intervals (e.g., regular or predetermined intervals) in the longitudinal direction on the top of the multi-step locking portion. The vehicle body may include a hood interior panel, a nozzle holding cover fixed to the hood interior panel, and the mounting aperture formed at the nozzle holding cover. A hook may be formed on the nozzle holding cover, and an end of the hook may be configured to be locked to the projections of the multi-step locking portion.

A heating assembly for heating washer fluid that passes through the nozzle portion may be disposed at a lower part of the nozzle portion within the housing. The heating assembly may include a heating body disposed in an insertion space defined at a lower part of the nozzle portion in the housing and may be configured to generate heat when power is supplied via a wire. A thermal conductor may be disposed at an interval between the heating body and the nozzle portion. A space between the heating body, the thermal conductor, and the nozzle portion may be filled with a thermal conductive filler in the insertion space. The thermal conductive filler may be an epoxy.

The bottom and the front of the insertion space may be obstructed by the bottom and the front of the housing, respectively, and the heating assembly may further include a plate-shaped cover fixed to a side of the housing to seal the insertion space by covering the sides of the insertion space. Protrusions may be formed on the bottom and the front of the housing. Further, coupling apertures where the protrusions are fitted may be formed in the cover, and the cover may be fixed to the housing by the protrusions and the coupling apertures.

A thermal conductor may be integrally fixed to the cover. A frame coupled to the thermal conductor may be integrally formed on the cover and may be a rectangular frame having the edges of the thermal conductor fixed therein. A seating portion may include a seat groove that protrudes on a side of the cover. The heating body may be seated and supported in the seat groove of the seating portion. A wire inserted in the insertion space and connected to the heating body may be inserted into a grove and may be formed on a lower side of the housing. The fixing groove may be formed in the left-right width direction of the housing that is the transverse direction with respect to the front-rear longitudinal direction of the housing.

[NOTE: We have moved this portion to the end of the description.]

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other exemplary embodiments, which may be included within the spirit and scope of the invention as defined by the appended claims.

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed there between.

Hereinafter, the present invention will be described more fully with reference to the accompanying drawings for those skilled in the art to easily implement the present invention.

The present invention relates to a non-exposing type washer nozzle that may be disposed on a hood interior panel and may be configured to spray washer fluid rearward to a windshield from beneath the hood of a vehicle. In particular, the washer nozzle may be disposed within a hood of a vehicle and may be configured to adjust an angle to allow a user to freely adjust a spraying direction and a target position of washer fluid. Further, the washer nozzle may include a heating unit (e.g., a heating assembly in the following description) that may be configured to heat sprayed washer fluid and that may provide improved heating performance for washer fluid.

Figure 1:
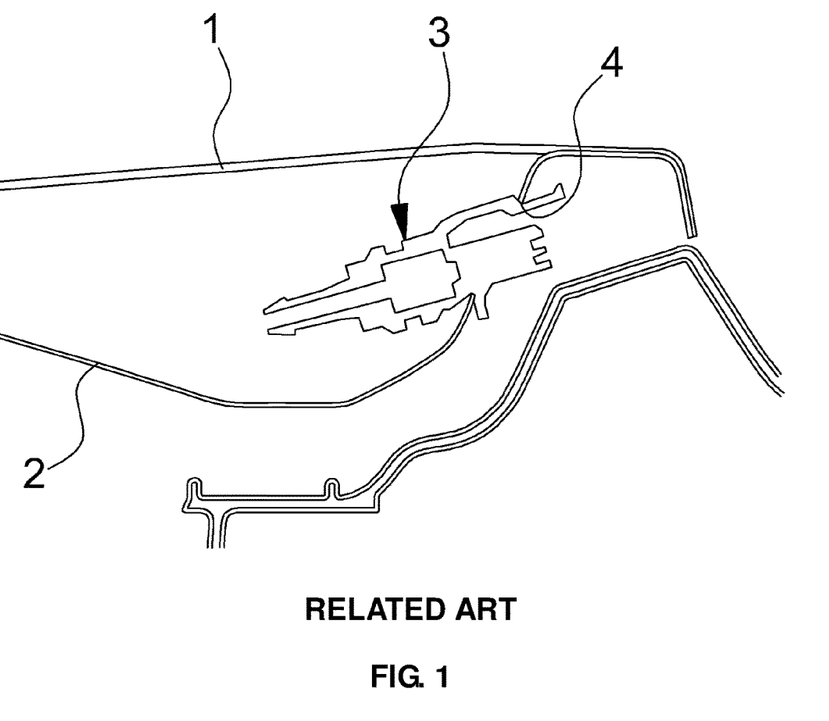
FIG. 1 is an exemplary cross-sectional view showing a mounting state of a non-exposing washer nozzle of the related art.

In order to assist in the understanding of the present invention described above, a mounting state of a non-exposing washer nozzle of the related art on a hood interior panel is described with reference to FIG. 1. Referring to FIG. 1, a washer nozzle 3 is mounted on a hood of a vehicle, which includes an outer panel 1 and an interior panel 2, at a position where it is not exposed, and inserted into a aperture 4 of the interior panel 2.

In this configuration, a non-exposing structure that has the washer nozzle 3 covered with the outer panel 1 of the hood and not exposed to the outside is achieved and washer fluid is sprayed to a windshield (not shown) behind the washer nozzle from beneath the hood. The washer nozzle 3 does not have any structure that adjusts the angle in the aperture 4 of the interior panel 2, particularly, the vertical angle, and may only be installed and fixed at a predetermined angle on the interior panel 2.

Since the installation angle of the washer nozzle 3 cannot be adjusted, the spraying angle and spraying direction of washer fluid cannot be adjusted to a desired angle and direction by a user and the target position of the washer fluid is necessarily fixed in accordance with the installation angle. Accordingly, a washer nozzle of the present invention may include a multi-step angle adjustment structure that may be configured to allow a user to adjust an installation angle on the hood interior panel in multiple steps.

Figure 2:
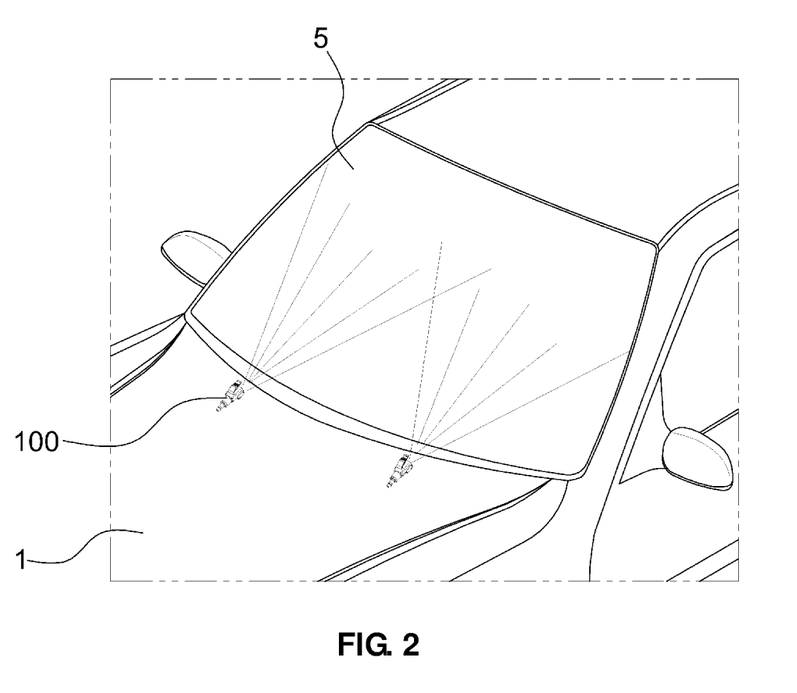
FIG. 2 is an exemplary perspective view showing a state when washer fluid is sprayed from washer nozzles according to an exemplary embodiment of the present invention.

FIG. 2 is an exemplary perspective view that shows operation when washer fluid is sprayed from non-exposing type washer nozzles according to an exemplary embodiment of the present invention. As shown in the figure, a non-exposing type washer nozzle 100 according to an exemplary embodiment of the present invention may be disposed beneath a hood (e.g., a lower side of a hood outer panel 1) and may be configured to spray washer fluid on to a windshield 5.

Figure 3:
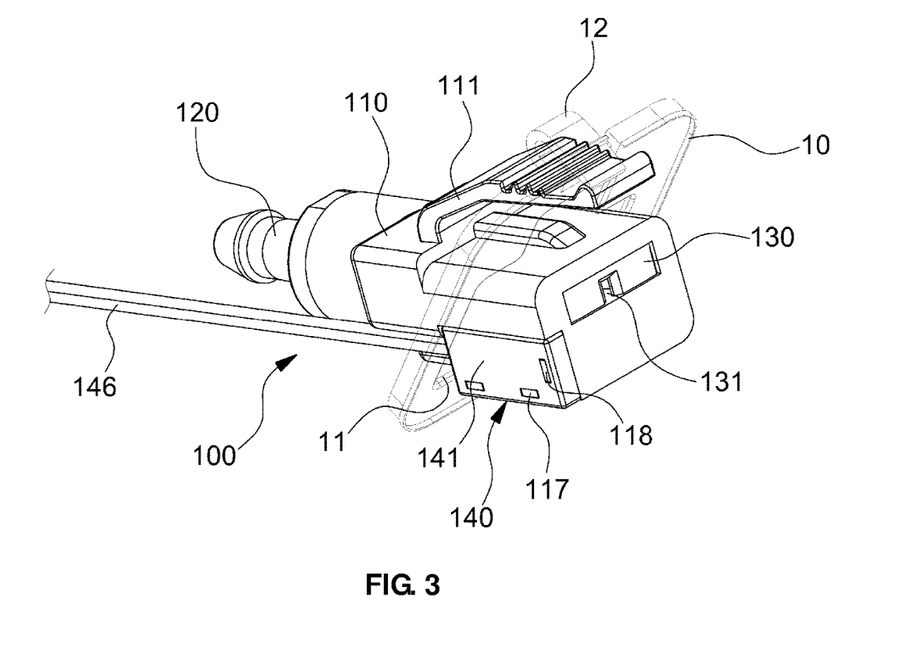
FIG. 3 is an exemplary perspective view of a washer nozzle according to an exemplary embodiment of the present invention.
Figure 4:
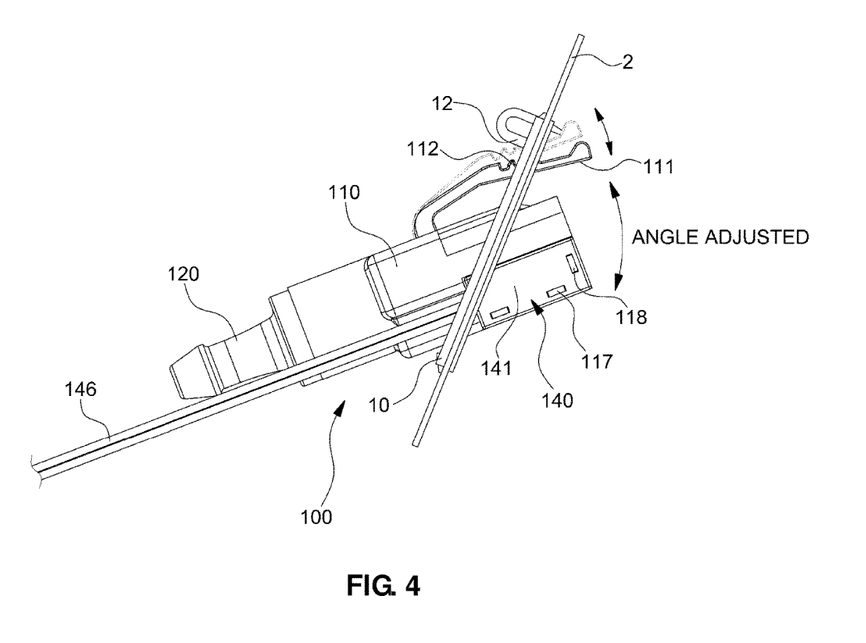
FIGS. 4 and 5 are exemplary side views of a washer nozzle according to an exemplary embodiment of the present invention.
Figure 5:
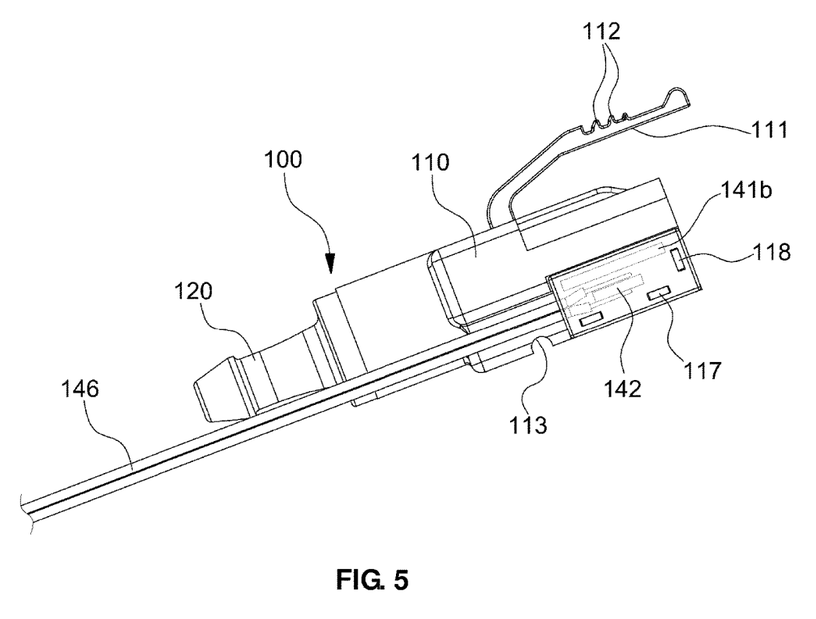

FIG. 3 is an exemplary perspective view of a washer nozzle according to an exemplary embodiment of the present invention and FIGS. 4 and 5 are exemplary side views of the washer nozzle according to an exemplary embodiment of the present invention. In FIG. 4, reference number 2 indicates a hood interior panel and reference number 10 indicates a nozzle holding cover that may be fixed to the hood interior panel. In FIG. 5, the hood interior panel and the nozzle holding cover are not shown and a cover (141 in FIG. 4) forming the exterior side of a heating assembly (140 in FIG. 4) is transparently shown to provide a view of the interior configuration.

Figure 6:
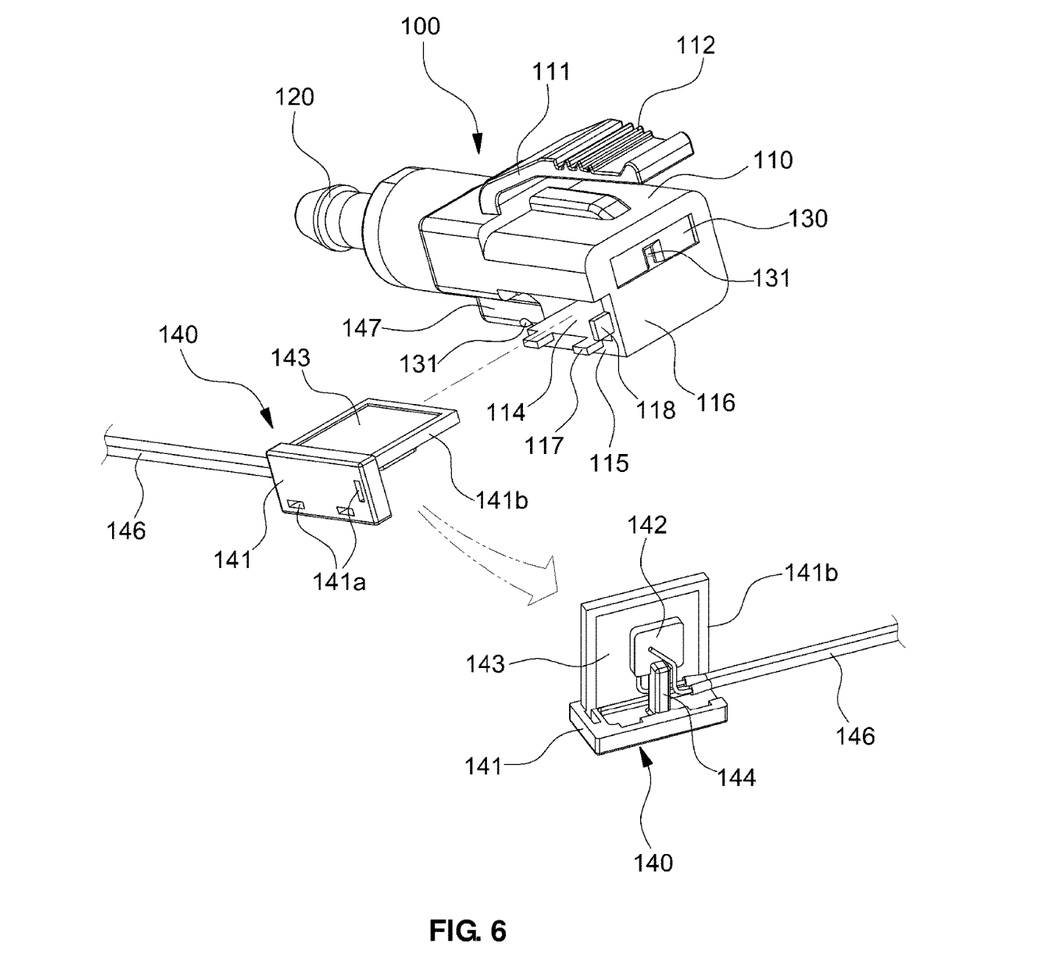
FIG. 6 is an exemplary exploded perspective view of a washer nozzle according to an exemplary embodiment of the present invention.
Figure 7:
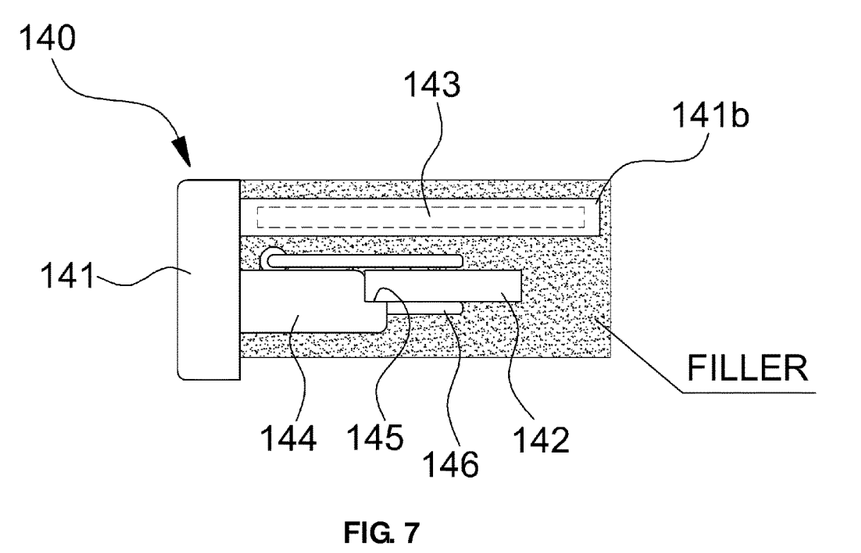
FIG. 7 is an exemplary cross-sectional view showing a heating assembly filled with a filler in a washer nozzle according to an exemplary embodiment of the present invention.

FIG. 6 is an exemplary exploded perspective view of the washer nozzle according to an exemplary embodiment of the present invention. FIG. 7 is an exemplary cross-sectional view that shows a state where the heating assembly of the washer nozzle according to an exemplary embodiment of the present invention is filled with a filler.

In particular, the washer nozzle 100 may include a housing 110, a nipple 120 coupled to the rear end of the housing 110 that may be configured to supply cleaning fluid into the housing 110, a check valve (not shown) disposed within the housing 110, and a nozzle chip 130 disposed within the housing and configured to spray washer fluid. The non-exposing spray type washer nozzle 100 of the related art also has the above configuration. For example, the nipple 120 may include a washer hose connector coupled to a washer hose (not shown). Accordingly, when washer fluid in a washer fluid reservoir is pumped out and transferred under pressure through the washer hose by a washer pump, the washer fluid may be supplied into the housing 110 through the nipple 120. The washer fluid supplied into the housing 110 may be supplied to the nozzle portion of the nozzle 100, through the nozzle chip 130 through a channel within the housing. The washer fluid may be supplied to the nozzle chip 130 through the check valve in the channel within the housing 110. The check valve may be provided to maintain pressure of washer fluid.

The nozzle chip 130 may be provided to spray washer fluid, and may include an interior channel through which washer fluid passes and a nozzle aperture 131 that may be configured to spray washer fluid. The washer fluid may pass through the interior channel of the nozzle chip 130, and washer fluid flow may be configured to spray at a wide angle through the nozzle aperture 131. Accordingly, washer fluid may be sprayed at a wide angle through the nozzle aperture 131 after the washer fluid passes through the interior channel of the nozzle chip 130. The sprayed washer fluid may reach a windshield glass and may be used as cleaning fluid to remove foreign substances.

The nozzle 100 according to an exemplary embodiment of the present invention may have an angle adjusting structure configured to adjust the installation angle of the washer nozzle 100 on a vehicle body on the hood interior panel 2 in several steps and this structure is described hereafter. The angle adjusting structure, may include a multi-step locking portion 111 that protrudes upward on the top of the housing 110 and extends forward (e.g., in the longitudinal direction of the washer nozzle) and may include a plate shape that may be configured to be elastically transformed up and down with respect to the joint with the housing 110. The term 'forward' refers to the forward direction in the spraying direction of washer fluid when washer fluid is sprayed forward from the nozzle aperture 131 of the nozzle chip 130 and reaches a windshield glass. In the front-rear direction of a vehicle, the multi-step locking portion extends rearward from the housing 110 in the front-rear direction of a vehicle.

Further, a plurality of projections 112 may be longitudinally arranged (e.g., in the front-rear direction) at a regular interval on the top of the multi-locking portion 111. A fixing groove 113 may be formed on the bottom of the housing 110 in the left-right direction of the housing 110, the transverse direction with respect to the front-rear longitudinal direction of the housing and may include a portion that is the rotational center of the washer nozzle 100 when the washer nozzle 100 is rotated (e.g., turned up/down) to adjust the angle on the nozzle holding cover 10, which will be described below. The fixing groove 113 may be positioned behind (e.g., in the spraying direction of washer fluid) the projections 112 of the multi-step locking portion 111 on the housing 110.

In this structure, when the upper portion of the nozzle holding cover 10 on the vehicle body is locked to one of the plurality of projections 112 of the multi-step locking portion 111, the lower interior-side end of a mounting aperture 11 of the nozzle holding cover 110 may be inserted into the fixing groove 113. The nozzle holding cover 10 may be locked to the fixing groove 113 and the projections 112 of the multi-step locking portion 111 on the top and bottom of the washer nozzle housing 110 and the fixing groove 113 may be positioned behind the projections 112. Accordingly, the nozzle holding cover 10 may be fixed to the hood interior panel 2 at a predefined angle.

The washer nozzle 100 according to an exemplary embodiment of the present invention may be fixed to the hood interior panel 2, through the nozzle holding cover 10 that is a separate member, and the nozzle holding cover 10 may be mounted on the hood interior panel 2 at a predetermined fixed angle. The nozzle holding cover 10 may allow the angle of the washer nozzle 100 to be adjusted under similar regardless of the angle and shape of the hood interior panel 2 and the shape for adjusting the angle may be freely determined. When the angle of the nozzle holding cover 10 about the hood interior panel 2 is fixed, the washer nozzle 100 may be adjusted to desired angles on the nozzle holding cover 10.

In other words, when the lower interior-side end of the mounting aperture 11 of the nozzle holding cover 10 is inserted into the fixing groove 113 and the upper portion of the nozzle holding cover 10 is locked to a selected one of the projections 112 of the multi-step locking portion 111, the angle of the washer nozzle 100 may be configured to be adjusted in accordance with the selected projection 112. As described above, after the washer nozzle 110 rotates about the fixing groove 113 with respect to the nozzle holding cover 10 to be positioned at a desired angle, the nozzle holding cover 10 may be locked to the selected projection 112, thereby being fixed. Since the multi-step locking portion 111 may be elastically transformed up and down on the housing 110 of the washer nozzle 100, when the nozzle holding cover 10 is locked to the selected projection 112 of the multi-step locking portion 111, the washer nozzle 100 may be stably fixed to the nozzle holding cover 10 by tension of the multi-step locking portion 111.

The washer nozzle 100 according to an exemplary embodiment of the present invention may include a heating assembly 140 configured to heat the washer fluid that passes through the nozzle chip 130 and the heating assembly 140 may be fixed to the housing 110 of the washer nozzle 100. In particular, the heating assembly 140 may be disposed at a lower portion of the nozzle chip 130 of the washer nozzle 100 and may include a heating body 142 configured to generate heat via power supplied through a wire 146 from the exterior. To ensure a space for the heating assembly 140, a groove-shaped insertion space 114 where the heating body 142 and a thermal conductor 143 are inserted, may be defined at a lower portion of the nozzle chip 130 within the housing 110 of the washer nozzle 100, as shown in FIG. 6. The nozzle chip 130 may be positioned over the insertion space 114 and the bottom and the front of the insertion space 114 may be obstructed (e.g., blocked) by the bottom 115 and the front 116 of the housing 110, respectively.

Further, the heating assembly 140 may include a plate-shaped cover 141 coupled to a side of the housing 110 to seal the insertion space 114 by covering the sides of the insertion space 114. The heating body 142 may be inserted within the insertion space 114 to generate heat, and the thermal conductor 143 may be disposed over the heating body 142 to transmit heat of the heating body 142 to the nozzle chip 130 between the heating body 142 and the nozzle chip 130 (e.g., nozzle portion). Coupling apertures 141a, in which protrusions 117 and 118 formed on the bottom 115 and the front 116 of the housing 110 respectively may be forcibly fitted, and may be formed on the cover 141. When the cover 141 is combined to cover the side of the insertion space 114 and the protrusions 117 and 118 of the housing 110 are forcibly fitted in the corresponding coupling apertures 141a, the entire heating assembly 140 including the cover 141 may be fixed to the housing 110. Further, a frame 141b where the thermal conductor 143 is fixed may be integrally formed on the top of the cover 141 and the thermal conductor 143 may be made of metal having high thermal conductivity.

The thermal conductor 143 may be positioned proximate to the upper end of the heating body 142 and the lower end of the nozzle chip 130 between the heating body 142 and the nozzle chip 130 to enable heat generated by the heating body 142 to be transmitted to the nozzle chip 130. Further, frame 141b may be a rectangular frame that surrounds the edges of the thermal conductor 143 to allow the edges of the thermal conductor 143 to be fixed therein.

A seating portion 144 may include a seat groove 145 to seat the heating body 142 that protrudes to a side at a lower side of the frame 141b in the cover 141. The heating body 142 may be disposed on the seat groove 145 to be supported by the seating portion 144. The heating body 142 may be plane-shaped body made of plastic (e.g., PTC) or metal that may be configured to generate heat using resistance when current is supplied.

The thermal conductor 143 and the heating body 142 may be arranged at a predetermined interval. Further, within the heating assembly 140, the heating body 142 may be disposed at a lower portion and the thermal conductor 143 may be positioned proximate to the nozzle chip 130 over the heating body 142. The wires 146 may be connected to the top and the bottom of the heating body 142 and may be configured to supply power to the heating body 142. In other words, current may be supplied to the heating body 142, and when ends of the wires 146 connected to the heating body 142 are inserted in the insertion space 114, the wires 146 may be arranged in a groove 147 formed on a lower side of the housing 110 of the washer nozzle 100.

The heating assembly 140 may be combined with the housing 110, with the cover 141, the thermal conductor 143, and the heating body 142 assembled in advance. As described above, the cover 141 may be coupled to the bottom 115 and the front 116 of the housing 110 to cover the side of the insertion space 114. The thermal conductor 143 and the heating body 142 may be inserted into the insertion space 114 at a lower portion of the nozzle chip 130. Further, with the heating assembly 140 combined with the housing 110, the insertion space 114 may be filled with a filler that has a thermal conductivity, as shown in FIG. 7. For example, thermal conductive epoxy may be preferable as the filler.

In an exemplary embodiment of the present invention, in place of the flexible wires 146 that may be bent easily, wires that maintain a bending shape at the ends connected to the heating body 142 may be used. Accordingly, the position of the heating body 142 may be maintained stably when epoxy is injected with the heating body 142 on the seating portion 144. In other words, the position of the heating body 142 may be maintained when epoxy is injected since the epoxy pushes the heating body 142, and the heating body 142 may be positioned at a predetermined position within the insertion space 114 of the housing 110. Accordingly, a decrease in the heating efficiency may be prevented due to the movement of the heating body 142 when epoxy is injected, and the heating body may be more firmly maintained at the position and the thermal conductivity and heating performance of the heating body may be improved.

Further, since thermal conductivity through the thermal conductor 143 may be improved, a target heating temperature of the heating body 142 may be reduced. In particular, epoxy with a low heat-resistance temperature may be used and a fire or deformation due to overheating may be prevented, and inexpensive epoxy may also be used. Further, by coupling the cover 141 to the housing 110 after integrally assembling the ends of the wires 146, the heating body 142 connected to the ends of the wires 146, the thermal conductor 143, and the cover 141, the heating unit of the washer nozzle 100 may be simplified. For example, the workability may be improved and epoxy may also be more easily injected after the heating body 142 and the thermal conductor 143 are inserted into the insertion space 114 of the housing 110. The epoxy may be injected in the direction in which the wires 146 fitted in the groove 147 of the housing 110 are inserted into the insertion space 114.

The nozzle holding cover 10 may include a mounting aperture 11 through which the washer nozzle 100 may be inserted, and fixed in an aperture of a vehicle body panel, that is, the hood interior panel 2. When the upper end of the nozzle holding cover 10 is locked to the projections 112 of the multi-step locking portion 111, the washer nozzle 100 may be fixed, and a hook 12 may be formed on the top of the nozzle holding cover 10 to allow an end of the hook 12 to be locked to the projections 112. Accordingly, the washer nozzle 100 may be inserted into the mounting aperture 11 of the nozzle holding cover 10 with the multi-step locking portion 111 pressed down. The lower interior-side end of the mounting aperture 11 may be fitted into the fixing groove 113 of the housing 110. The multi-step locking portion 111 may be released and the end of the hook 12 may be configured to be locked to the projections 112 of the multi-step locking portion 111, thereby finishing mounting the washer nozzle 100.

The end of the hook 12 may be locked to one of the projections 112 of the multi-step locking portion 111 and may be configured to rotated (e.g., turned up and down) the washer nozzle to a desired angle about the fixing groove 113. When the end of the hook 12 is locked to the projection 112 of the multi-step locking portion 111, the wash nozzle 100 may be maintained at the fixed position by tension of the multi-step locking portion 111.

Further, to adjust the angle of the washer nozzle 100, the multi-step locking portion 111 may be pressed again to be unlocked from the hook 12. In particular, the washer nozzle 100 may be rotated to a desired angle about the fixing groove 113. A projection 112 that maintains the rotation angle may be selected again and released and the end of the hook 12 may be locked to the adjusted projection 112. When a plurality of projections 112 are formed on the multi-step locking portion 111 the angle of the washer nozzle 100 may be adjusted (e.g., up and down) in multi-steps by a predetermined angle through rotation of the nozzle. Further, the projections 112 may be formed with different heights to adjust the angle of the washer nozzle 100 in multi-steps. As shown in FIG. 5, the height of the projections 112 closer to the front end of the multi-step locking portion 111 may be formed lower than.

According to the washer nozzle for a vehicle of the present invention, a multi-step locking portion having a plurality of projections for locking to a vehicle body panel is provided, so it may be possible to adjust and fix the washer nozzle at a desired angle by selecting the projections and a user can adjust the spraying direction and the target position of washer fluid to desired direction and angle by adjusting the angle of the washer nozzle. Further, since a heating assembly that may generate optimal heat generation performance, it may be possible to heat sprayed washer fluid and achieve high heating performance and efficiency.

Although exemplary embodiments of the present invention were described in detail above, the scope of the present invention is not limited to the exemplary embodiments and various changes and modifications from the spirit of the present invention defined in the following claims by those skilled in the art are also included in the scope of the present invention.

What is claimed is:

1. A washer nozzle for a vehicle, comprising:
   a housing;
   a washer hose connector disposed on the housing;
   a nozzle portion disposed on the housing to spray washer fluid forward;
   a multi-step locking portion having a plurality of projections formed on the top of the housing; and
   a fixing groove, where a lower interior-side end of a mounting aperture formed at a vehicle body is inserted, formed on the bottom of the housing;
   wherein the washer nozzle is inserted in the mounting aperture and the washer nozzle is configured to rotate to adjust an angle about the fixing groove in which the lower interior-side end of the mounting aperture is inserted, one selected projection of the multi-step locking portion is configured to lock to a portion of the vehicle body to maintain the adjusted angle of the washer nozzle,
   wherein a heating assembly for heating washer fluid that passes through the nozzle portion is disposed at a lower part of the nozzle portion in the housing,
   wherein the housing includes an insertion space defined at a lower part of the nozzle portion,
   wherein the bottom and the front of the insertion space are blocked by the bottom and the front of the housing respectively and the heating assembly further includes a plate-shaped cover coupled to a side of the housing to seal the insertion space by covering the sides of the insertion space, and
   wherein the heating assembly further includes:
      a heating body disposed in the insertion space and configured to generate heat when power is supplied through a wire; and
      a thermal conductor disposed at an interval between the heating body and the nozzle portion,
      wherein a space between the heating body, the thermal conductor, and the nozzle portion is filled with a thermal conductive filler in the insertion space.

2. The washer nozzle of claim 1, wherein the multi-step locking portion has a shape that protrudes upward on the housing and elongated in the front-rear direction of the washer nozzle, and is configured to elastically transform up and down with respect to a joint with the housing, and the projections are formed at a regular interval in the longitudinal direction on the top of the multi-step locking portion.

3. The washer nozzle of claim 1, wherein the vehicle body is a hood interior panel, a nozzle holding cover is fixed to the hood interior panel and the mounting aperture is formed at the nozzle holding cover.

4. The washer nozzle of claim 3, wherein a hook is formed on the nozzle holding cover, and an end of the hook is configured to be locked to the projections of the multi-step locking portion.

5. The washer nozzle of claim 1, wherein the thermal conductive material is epoxy.

6. The washer nozzle of claim 1, wherein protrusions are formed on the bottom and the front of the housing, coupling apertures where the protrusions are fitted are formed in the plate-shaped cover, and the plate-shaped cover is fixed to the housing by the protrusions and the coupling apertures.

7. The washer nozzle of claim 1, wherein a thermal conductor is coupled to the cover.

8. The washer nozzle of claim 7, wherein a frame where the thermal conductor is fixed is formed on the cover and is a rectangular frame that surrounds the edges of the thermal conductor to fix the edges of the thermal conductor therein.

9. The washer nozzle of claim 1, wherein a seating portion has a seat groove that protrudes on a side of the cover and the heating body is seated and supported in the seat groove of the seating portion.

10. The washer nozzle of claim 1, wherein a groove in which the wire inserted in the insertion space and connected to the heating body is inserted is formed on a lower side of the housing.

11. The washer nozzle of claim 1, wherein the fixing groove is formed in the transverse direction of the housing with respect to the front-rear longitudinal direction of the housing.

* * * * *